United States Patent [19]
Miyaki et al.

[11] 3,756,213
[45] Sept. 4, 1973

[54] INTERNAL COMBUSTION ENGINE OF THE FUEL INJECTION TYPE

[75] Inventors: Kiyoshi Miyaki, Asaka; Toshihiko Sato, Saitama-ken, both of Japan

[73] Assignee: Honda Giken Kogyo Kakushiki Gaisha, Tokyo, Japan

[22] Filed: Aug. 18, 1971

[21] Appl. No.: 172,729

[30] Foreign Application Priority Data
Aug. 20, 1970 Japan.............................. 45/72411

[52] U.S. Cl....................... 123/179 L, 123/139 AW
[51] Int. Cl............................................. F02n 17/08
[58] Field of Search................. 123/179 L, 140 MP, 123/139 AW

[56] References Cited
UNITED STATES PATENTS

| | | | |
|---|---|---|---|
| 3,020,905 | 2/1962 | Goschel........................... | 123/179 L |
| 3,614,945 | 10/1971 | Schlagmuller................... | 123/179 L |
| 3,494,337 | 2/1970 | Alderson....................... | 123/140 MP |
| 3,664,319 | 5/1972 | Channing........................ | 123/179 L |
| 3,614,946 | 10/1971 | Staudt et al..................... | 123/179 L |
| 3,638,631 | 2/1972 | Eheim............................. | 123/179 L |
| 2,906,253 | 9/1959 | Nallinger....................... | 123/140 MP |

Primary Examiner—Laurence M. Goodridge
Assistant Examiner—Cort R. Flint
Attorney—Eric H. Waters et al.

[57] ABSTRACT

An internal combustion engine of the fuel injection type having a main fuel injection nozzle for normal running of the engine, a starting fuel injection nozzle for starting or warming up of the engine, means for adjusting the amount of fuel injected with said main nozzle respondingly to negative pressure in the interior of an intake pipe downstream of a throttle valve, means for increasing fastly the amount of fuel injected with said main nozzle independently of said means for adjusting the amount of fuel and allowing to inject supplementary fuel with said starting fuel injection nozzle in low temperature condition of the engine, means for adjusting continuously the amount of the supplementary fuel manually or automatically with the operation of a temperature sensitive member settled on a proper portion of the engine.

3 Claims, 2 Drawing Figures

INTERNAL COMBUSTION ENGINE OF THE FUEL INJECTION TYPE

BRIEF SUMMARY OF THE INVENTION

The present invention relates to an internal combustion engine of the fuel injection type which is able to start rapidly and smoothly.

In cold condition of the atmosphere, it is usually not easy to start an internal combustion engine. In such condition, it is necessary to supply much more fuel into the combustion chamber of the engine during starting or warming up operation of the engine than that during normal running of the engine.

An object of the present invention is to provide an internal combustion engine which is able to start easily and smoothly being supplied with adjusted enough amount of fuel into the combustion chamber even in cold condition of the atmosphere.

Another object of the present invention is to provide an internal combustion engine the combustion chamber of which is is supplied with proper amount of fuel continuously adjusted with an adjusting means.

According to the invention, an internal combustion engine of the fuel injection type has a main fuel injection nozzle and a starting fuel injection nozzle in the interior of the intake pipe downstream of the throttle valve of the engine. The amount of fuel injected with the main fuel injection nozzle is adjusted by a negative pressure governor responsive to negative pressure in the interior of the intake pipe downstream of the throttle valve during normal running of the engine. But, during starting or warming up operation of the engine, the amount of fuel injected with the main fuel injection nozzle is increased by the operation of a leak valve which opens the negative pressure chamber of the negative pressure governor into the atmosphere, and the starting fuel injection nozzle injects supplementary fuel under adjusting by the starting fuel controlling valve which is operated by manual operation or the operation of a temperature sensitive member settled on proper portion of the engine.

In further accordance with the invention, said engine has a cutoff valve interposed in a fuel passage between the starting fuel injection nozzle and a fuel tank, which allows fuel to pass through only in low temperature condition of the engine.

DETAILED DESCRIPTION

Figure 1:
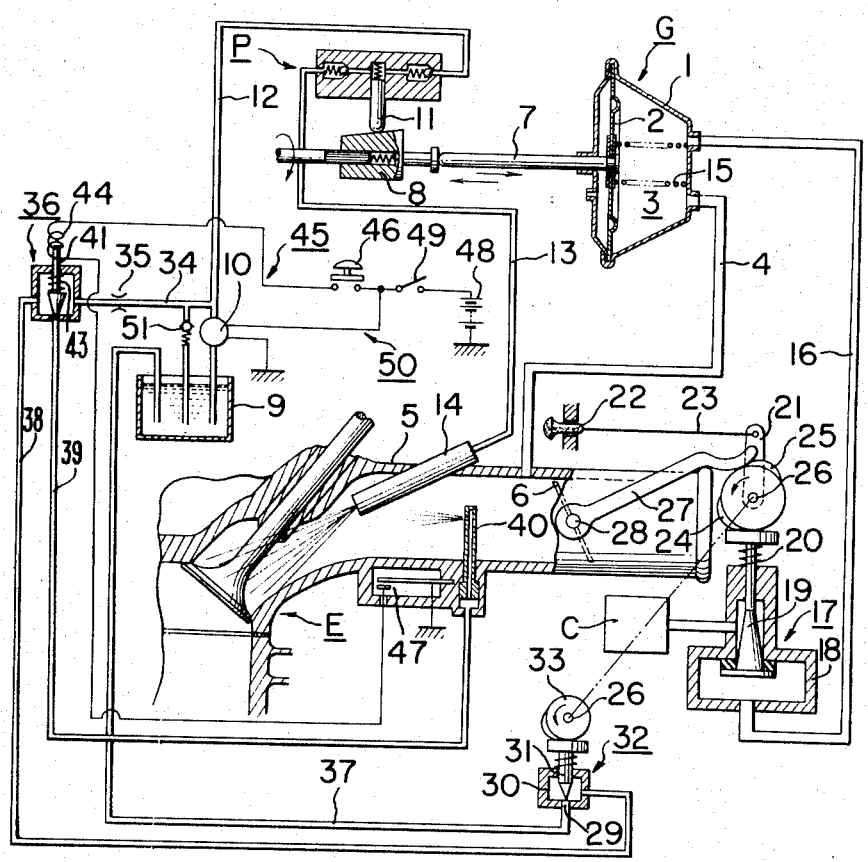
FIG. 1 is a schematic and mainly sectional side view illustrating components of, or associated with, fuel injection apparatus of an internal combustion engine of fuel injection type according to the present invention.

Referring to FIG. 1 of the drawing, there is seen a portion of an internal combustion engine of the fuel injection type having an air intake pipe 5. The air intake pipe 5 has a main fuel injection nozzle 14 which is connected to a fuel tank 9 with a pipe 12 having a feed pump 10 on its way and a pipe 13 connected to the pipe 12 with an injection pump P, a starting fuel injection nozzle 40 which is also connected to the fuel tank 9 with a pipe 34 branched from the pipe 12 downstream of the feed pump 10, having a throttle 35 on its way and a branched pipe having a regulating valve 51 on its way branched from the pipe 34 upstream of the throttle 35, and a pipe 39 one end of which is connected to the end of the pipe 34 with an electromagnetic starting valve 36, and an opening which is connected into the negative pressure chamber 3 of a negative pressure governor G through a boost pipe 4, each in the interior of the intake pipe 5 downstream of a throttle valve 6 pivotted on a pivot 28 with a fast idling lever 27 as described later.

The governor G has a diaphragm 2 usually leftwardly enforced by a compression spring 15 provided within the chamber 3 surrounded by a casing 1. An operating rod 7 one end of which is fixed to the center portion of the diaphragm 2 is connected at its free end to the protruded portion of a control cam 8. The plunger 11 of the injection pump P is in contact with the periphery of the control cam 8, so that fuel injection effected by the pump P is controlled by the control cam 8 which is reciprocated by operation of the diaphragm 2. Thus, as shown in FIG. 1, the fuel injection amount is increased if the control cam 8 is moved to the left and is decreased if the cam 8 is moved to the right.

Accordingly, when the engine E is running, the negative pressure within the intake pipe 5, which pressure depends on the operating condition of the engine, acts on the interior of the negative pressure chamber 3 through the boost pipe 4, changes in this pressure causing the control cam 8 to move to control the injection of fuel effected by the pump P.

The throttle valve 6 can be turnably moved with the fast idling lever 27 the free end of which contacts with the surface of a cam 25 by turning of the cam 25 about a supporting axle 26. An operating lever 21 one end of which is fixed to the axle 26 is connected at its free end to an operation knob 22 with a drag wire 23. The lever 21 is usually enforced to tend to turn clockwise about the axle 26 with a spring member (not shown). Thus, if the knob 22 is pulled against the force of the lever 21, the throttle valve 6 is turnably moved to supply more enough air into the engine with operation of the cam 25 and the lever 27.

On the axle 26, another two cams 24, 33 are also fixed. The cam 24 contacts with the upper surface of the needle valve 19 of a leak valve 17 which is able to leak negative pressure within the negative pressure chamber 3 into the atmosphere through a leak pipe 16 settled between the governor G and the leak valve 17, and an air cleaner C settled between the leak valve 17 and the atmosphere. The cam 24 pushes down the valve 19 against the force of the spring 20 between the flange at the uppermost portion of the valve 19 and the casing 18 of the valve 17 when the lever 21 is turned counterclockwise about the axle 26, so that the valve 17 allow air from the atmosphere to enter the chamber 3 through the air cleaner C, gap between the flange at the lowermost portion of the needle valve 19 and the valve bed of the casing 18, made by the downward movement of the valve 19, and the leak pipe 16. Accordingly, the pulling operation of the knob 22 effects at least rapid increasing of the amount of fuel injected with the nozzle 14 and of air intaked.

The feed pump 10 starts when the ignition circuit 50 having a source of electricity 48 and an ignition switch 49 in series in its self is closed. A starting electric circuit 45 branched from the ignition circuit 50 between the ignition switch 49 and the feed pump 10 has a starting switch 46, an electromagnetic coil 44 and a thermoswitch 47 settled on outer portion of the intake pipe 5 in series in itself.

The coil 44 acts on a valve 41 against the force of a compression spring 43 to supply supplementary fuel from the fuel tank 9 to the starting fuel injection nozzle 40 through the pipe 34, 39 when the circuit 45 is closed.

The thermoswitch 47 acts its performance in responce to temperature of the engine and closes the circuit 45 only below a predetermined temperature of the engine at its portion of the circuit 45. The circuit 45 can be completely closed when all of the ignition switch 49, the starting switch 46 and the thermoswitch 47 are closed.

A leak pipe 38 is elongated from the valve 36 to a starting fuel controlling valve 32, and a pipe 37 is elongated from the valve 32 into the fuel tank 9, so that fuel passing through the valve 36 is leaked in amount adjusted by the valve 32. The valve 32 is controlled with the cam 33 which pushes down the needle valve 31 against the force of the spring set between the flange of the valve 31 and the casing 30 of the valve 32, so that gap made by the tip of the valve 31 in the opening 29 of the casing 30 forms a variable orifice. Accordingly, if temperature of the engine is so low that starting of the engine is not easy, the circuit 45 will be completely closed by closing the switches 46 and 49, and supplementary fuel is supplied from the fuel tank 9 to the starting fuel injection nozzle 40 under the control of the valve 32.

The valve 32 is controlled manually with the throttle valve 6 and the leak valve 18 by operation of the knob 22. But, if necessary, it can be controlled independently from the other valves, with manual or automatical means.

Figure 2:
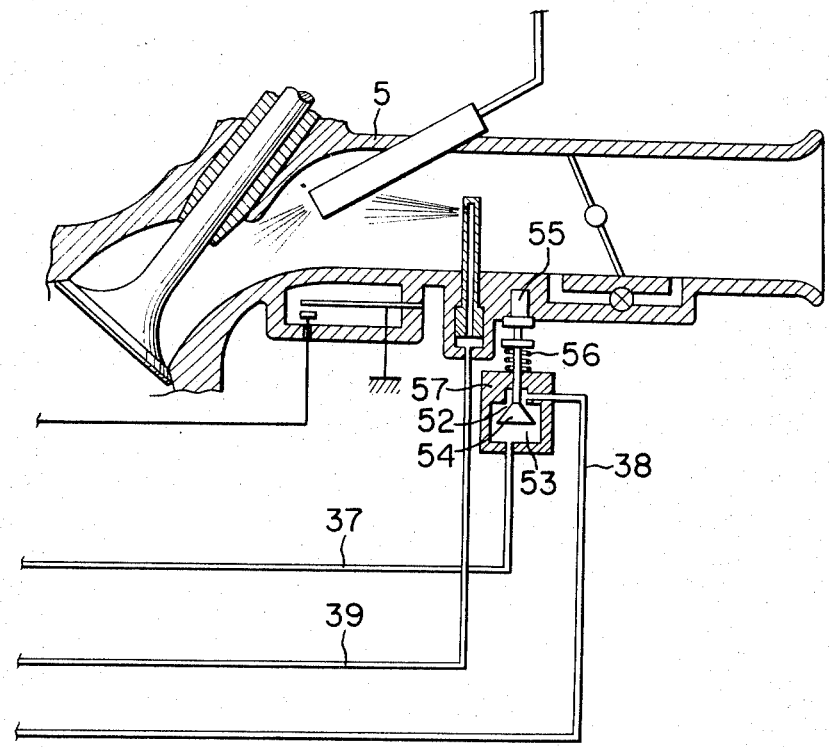
FIG. 2 is an enlarged sectional side view illustrating another type of starting fuel adjusting valve instead of the starting fuel adjusting valve shown in FIG. 1.

The valve in FIG. 2 shows a control valve controlling supplementary starting fuel, operated by a temperature sensitive member settled on the outer surface of the air intake pipe.

The temperature sensitive member 55 pushes down the leak valve 54 against the force of the spring 56 set between the flange of the valve 54 and the casing 57 of the valve 54, responsively to temperature of the engine, so that the lower temperature of the engine is, the narrower the gap between the tapered surface of the valve 54 and the circular inside corner of the casing 57 is, to supply more amount of fuel to the starting fuel injection nozzle 40 than that in high temperature condition of the engine.

What is claimed is:

1. In an internal combustion engine of the fuel injection type, fuel injection means comprising: an air intake pipe; a main fuel injection nozzle communicating with said pipe and injecting fuel for normal running of said engine; a starting fuel injection nozzle communicating with said pipe and injecting fuel for starting and warming up of said engine; a fuel tank for supplying fuel to said injection nozzles; conduit means interconnecting said fuel tank and said main fuel injection nozzle; an electromotive fuel feed pump being positioned in said conduit proximate to said fuel tank; a fuel injection pump being positioned in said conduit proximate to said main injection nozzle; an excess-fuel branch conduit connected to said conduit means intermediate said fuel feed pump and said fuel injection pump, said branch conduit leading to said fuel tank; engine starting fuel supply conduit means being connected to said branch conduit and said starting fuel injection nozzle; fuel-flow control valve means being positioned in said branch conduit for controlling the flow rate of fuel therethrough; and normally-closed valve means interposed in said starting fuel supply conduit means adapted to be biased into an open fuel-flow position in response to starting of said engine.

2. Fuel injection means as claimed in claim 1, said fuel-flow control valve being manually adjustable.

3. Fuel injection means as claimed in claim 1, comprising temperature sensing means on said engine; and means for adjusting said fuel-flow control valve for varying the flow sets of fuel to said starting fuel injection nozzle in response to sensed low temperature conditions of said engine upon starting and during warming-up of said engine.

* * * * *